US010294996B2

(12) United States Patent
Nielsen et al.

(10) Patent No.: US 10,294,996 B2
(45) Date of Patent: May 21, 2019

(54) ACTUATING DEVICE FOR A PUMP UNIT

(71) Applicant: GRUNDFOS HOLDING A/S, Bjerringbro (DK)

(72) Inventors: Tonny Ring Nielsen, Viborg (DK); Oluf Kjær, Bjerringbro (DK); Troels Holtum Rasmussen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 611 days.

(21) Appl. No.: 14/894,190

(22) PCT Filed: May 6, 2014

(86) PCT No.: PCT/EP2014/059192
§ 371 (c)(1),
(2) Date: Nov. 25, 2015

(87) PCT Pub. No.: WO2014/191169
PCT Pub. Date: Dec. 4, 2014

(65) Prior Publication Data
US 2016/0102715 A1 Apr. 14, 2016

(30) Foreign Application Priority Data
May 31, 2013 (EP) ..................................... 13170034

(51) Int. Cl.
*H02K 11/00* (2016.01)
*F16D 11/14* (2006.01)
(Continued)

(52) U.S. Cl.
CPC .......... *F16D 11/14* (2013.01); *F04D 13/0626* (2013.01); *F04D 13/0686* (2013.01);
(Continued)

(58) Field of Classification Search
CPC .. F16D 11/14; F04D 13/0626; F04D 13/0686; F04D 25/06
(Continued)

(56) References Cited

U.S. PATENT DOCUMENTS

| 8,222,777 B2* | 7/2012 | Loussert | H02K 11/01 310/156.62 |
| 2010/0051716 A1* | 3/2010 | Walton | F01L 21/04 239/61 |
| 2010/0151979 A1* | 6/2010 | Baer | F02B 67/06 474/199 |

FOREIGN PATENT DOCUMENTS

| DE | 20 32 898 A1 | 4/1971 |
| DE | 16 53 741 A1 | 5/1971 |

(Continued)

*Primary Examiner* — Jianchun Qin
(74) *Attorney, Agent, or Firm* — McGlew and Tuttle, P.C.

(57) ABSTRACT

An actuation device for a pump assembly such as for application in a can of a pump assembly for force impingement of a shaft situated in the can. The device includes a carrier for connection to the can and a passage extending along a longitudinal axis. An actuation pin is led in the passage along a longitudinal axis and has a first axial end including a tool receiver and a an opposite second axial end including an engagement region for force transmission onto a shaft. A spring element is arranged between the actuation pin and the carrier and impinges the actuation pin with a spring force in a first axial end direction. A seal is arranged between the carrier and the actuation pin, in a region between the spring element and the second axial end. A pump assembly with such an actuation device is also provided.

19 Claims, 4 Drawing Sheets

(51) Int. Cl.
- *F04D 13/06* (2006.01)
- *F04D 29/42* (2006.01)
- *F04D 25/06* (2006.01)
- *F04D 29/043* (2006.01)
- *F04D 29/046* (2006.01)
- *F04D 29/053* (2006.01)
- *F04D 29/056* (2006.01)
- *F04D 29/18* (2006.01)
- *F04D 29/26* (2006.01)

(52) U.S. Cl.
CPC ........... *F04D 25/06* (2013.01); *F04D 29/043* (2013.01); *F04D 29/046* (2013.01); *F04D 29/053* (2013.01); *F04D 29/056* (2013.01); *F04D 29/18* (2013.01); *F04D 29/26* (2013.01); *F04D 29/426* (2013.01); *H02K 11/00* (2013.01)

(58) Field of Classification Search
USPC ....................................................... 310/68 R
See application file for complete search history.

(56) References Cited

FOREIGN PATENT DOCUMENTS

| | | |
|---|---|---|
| DE | 295 09 338 U1 | 9/1995 |
| DE | 195 34 179 A1 | 3/1997 |
| EP | 1 041 595 A2 | 10/2000 |
| EP | 2 072 826 A1 | 6/2009 |
| EP | 2 072 827 A1 | 6/2009 |

\* cited by examiner

ACTUATING DEVICE FOR A PUMP UNIT

CROSS REFERENCE TO RELATED APPLICATIONS

This application is a United States National Phase Application of International Application PCT/EP2014/059192 filed May 6, 2014 and claims the benefit of priority under 35 U.S.C. § 119 of European Patent Application 13 170 034.6 filed May 31, 2013 the entire contents of which are incorporated herein by reference.

FIELD OF THE INVENTION

The invention relates to an actuation device, in particular to a deblocking device for a pump assembly.

BACKGROUND OF THE INVENTION

With wet-running pump assemblies, i.e. pump assemblies with electrical drive motors which are designed as canned motors, in which the rotor space is filled with the fluid to be delivered, there exists the danger that the rotor becomes blocked in the bearings given a standstill, due to contamination in the fluid. For this reason, it has been common for some time now, to provide a closure screw at the axial end of the can, said screw being able to be opened, in order with a tool to manually rotate the shaft located in the can and to thus be able to unblock the rotor. The disadvantage with this system however is the fact that the can must be opened, so that fluid can penetrate to the outside out of the inside of the can.

Moreover, it is known to provide a spring-loaded engagement element at the axial end of the can, said element being able to be pressed with a tool from the outside and then coming into engagement with the shaft, in the inside of the can, in order to be able to rotate this shaft for unblocking. In normal operation, the engagement element is held in a manner disengaged from the shaft, by way of spring. The problem with such systems is the fact that the spring can block due to contamination in the fluid, or that the device is not adequately sealed since it breaks through the can, so that fluid can exit to the outside.

SUMMARY OF THE INVENTION

Against the background of this problem, it is an object of the invention, to provide an actuation device, in particular a deblocking device, for a pump assembly and which is envisaged for the application in a can of a pump assembly for the force impingement of a shaft situated in the can, said device being improved to the extent that the reliability of the function is increased and an improved sealedness is achieved.

The actuation device according to the invention is provided for use in a pump assembly. Thereby, the actuation device is designed such that it can be applied into a can of a pump assembly, in order to impinge a shaft situated in the can with a force. This can be a force acting on the shaft in the axial direction and/or a torque acting on the shaft. A can in this context is also to be understood as canned pot.

With regard to the actuation device according to the invention, it is particularly the case of a deblocking device which is envisaged for releasing a blocked shaft in the inside of a can, by way of a force effect from the outside. This too can be effected by way of a linear force action or applying a torque, in order to release a blocking of the shaft in its bearings. The shaft in the can or in its bearings is preferably axially moveable by a certain amount, in order to achieve a release by way of applying an axial force. The actuation device according to the invention can also be used in order to accomplish other actuation functions in the inside of the can, by way of a force application from outside. Thus, for example, the operating condition of a pump assembly can be examined via the actuation device. For example, a possible play of the shaft in the axial direction and which can be due to wear of the bearing or impeller, can also be examined. Thus, a wearing of the pump assembly can be examined with the actuation device according to the invention.

In order for the actuation device according to the invention to be able to be fixed in a can, the actuation device comprises a carrier which is designed such that it can be connected to the can, in order to fix the complete actuation device on the can, i.e. in particular an opening of the can. Such an opening is preferably centrically arranged at the axial end of the can, i.e. in an axial face side, so that it lies exactly opposite the axial end of a shaft in the can. The carrier comprises a passage which extends along a longitudinal axis of the actuation device or of the carrier. This longitudinal axis with a correct installation of the actuation device into a pump assembly preferably lies along the rotation axis of the pump assembly or of the shaft arranged in the can of the pump assembly. According to the invention, an actuation pin is led in this passage. Thereby, the actuation pin in the passage can be moved in the axial direction along the longitudinal axis and be additionally rotatably guided in the passage about the longitudinal axis. The rotation ability of the actuation pin permits a torque transmission onto the shaft of the pump assembly, whereas the linear movability permits the application of an axial force on the shaft and permits the actuation pin to be brought into engagement or bearing contact with shaft and for it to able to be brought out of engagement or bearing contact with the shaft.

The actuation pin at its first axial end comprises a tool receiver. This tool receiver serves for coming into engagement with a tool for force transmission. A tool in this context can also be another connecting component, with whose help a force is to be applied onto the actuation pin. In particular, it can be the case of a further component of the pump assembly. The tool receiver in particular is designed in a manner such that it permits a centering of the tool on the actuation pin, so that a centric force introduction is ensured and a slipping of the tool is prevented. Thereby, the tool receiver can be designed for transmitting an axial force in the direction of the longitudinal axis and/or for transmitting a torque about the longitudinal axis. Preferably, the tool receiver is designed in a manner fitting with common screwdrivers or spanners.

The actuation pin at its opposite, second axial end comprises an engagement region for force transmission onto a shaft. I.e. the engagement region is envisaged for coming into contact or into engagement with an axial end of the shaft, in order to transmit a force from the actuation pin onto the shaft. The engagement region can be designed as a contact surface which comes into bearing contact on a face end of the shaft, for transmitting a purely axial force. The engagement region for torque transmission is shaped such that it can come into engagement with a corresponding, in particularly complementarily shaped engagement region at the axial end of the shaft, with a positive and/or non-positive fit, in order to transmit a torque onto the shaft.

A spring element which impinges the actuation pin in the direction of its first axial end with a spring force is arranged between the actuation pin and the carrier. The spring element can thus press the actuation pin into a rest position, in which the engagement region is held in a manner disengaged from the shaft in the inside of the can. The actuation pin must be moved linearly in the direction of the longituninal axis against the spring force by a certain amount, in order to bring the engagement region into engagement or bearing contact with the shaft. If the force necessary for this is released, the actuation pin moves back into its rest position and disengages from the shaft due to the spring element. Thereby, an abutment is preferably provided, on which the actuation pin bears in its rest position, so that the abutment limits the longitudinal movability of the actuation pin in one direction. In the opposite movement direction, the spring element itself forms the abutment which limits the maximum longitudinal movability of the actuation element. The actuation pin cannot move further in the longitudinal direction if the spring element is completely compressed. Thus, the longitudinal movability of the actuation pin in both directions is limited by abutments, wherein an end abutment, in the direction, in which the actuation pin is brought into engagement with the shaft, is preferably situated such that in the functional condition, the actuation pin comes into engagement or bearing contact with the shaft before the end abutment is reached.

According to the invention, a seal is arranged between the carrier and the actuation pin, in a region between the spring element and the second axial end carrying the engagement region. This seals the gap between the carrier and the actuation pin. The arrangement of the seal at this position has the advantage that the spring element is situated outside the space which is subjected to fluid. A compromising of the function and the durability of the spring element by the fluid in the inside of the can is prevented in this manner. I.e. the spring element lies in the dry space. Moreover, this design additionally permits the provision of the region of the actuation device, in which the spring element is provided, with a lubricant, by way of which the movability is improved and the service life of the sealing contact on movement is increased. Moreover, the seal can be arranged as closely as possible on the can, and the construction length of the actuation device which extends in the inside of the can, can be kept short, so that essentially no additional construction space needs to be provided in the inside of the can for the actuation device. The fluid-filled rotor space can be kept short in the axial direction by way of this.

The carrier is preferably designed for the sealed connection to the can. I.e. the carrier is sealed with respect to the can, so that it sealingly closes the opening which is provided in the can for receiving the actuation device, and an exit of fluid is prevented.

Particularly preferably, the carrier is designed for welding to a can and for this preferably further comprises a peripheral collar for seaming on a weld seam. A permanent and sealed connection between the actuation device and the can, can be created by way of forming a weld seam between the carrier and the can. This is particularly the case if both components are formed from metal. A necessary weld seam can be formed for example by way of laser welding. Laser welding has the advantage that the applied heat quantity can be kept low, so that further components, in particular the seal, are not damaged on welding. This is particularly advantageous if the actuation device is to be welded to the can in the assembled condition.

Preferably, the actuation device is designed as a preassembled subassembly which as a whole can be connected, in particular welded to a can, or inserted into an opening of the can. This has the advantage that the complete actuation device can be preassembled independently of the pump assembly.

The peripheral collar of the carrier is preferably formed by a projection which projects radially outwards over the whole periphery and which further preferably can come into bearing contact on an axial face side of the can or canned pot and welded there. Thus, an adequately large region is created for receiving a weld seam. Simultaneously, this design permits the weld seam to be produced in a manner distanced to the seal, so that the thermal loading of the seal is kept low.

According to a preferred embodiment, the actuation pin at its first axial end comprises a tool receiver designed as a crossed slot. Such a crossed slot can be designed such that an engagement with a common Phillips screwdriver is possible. The crossed slot permits an automatic centering of the tool in the tool receiver and a good torque transmission which is necessary if the actuation pin is to be rotated for rotating a pump assembly. Alternatively, the tool receiver can however also be shaped differently, in particular also be shaped differently for torque transmission, i.e. have a different, non-rotationally symmetrical shaping. If it is only an axial force transmission onto the actuation pin which is to be effected, the tool receiver can also be designed as an abutment surface, on which a tool comes into bearing contact for the linear force transmission along the longitudinal axis of the actuation pin. Thereby, such an abutment surface as the case may be can comprise a deepening for centring the tool and for preventing a slipping of the tool.

The engagement region at the second axial end of the actuation pin and which is provided for bearing contact or engagement with a shaft of a pump assembly, further preferably comprises a rectangular and in particular a square cross section. This engagement region is preferably designed such that it can engage with a corresponding, complementary engagement region at the axial end of a shaft of the pump assembly, with a positive fit. An engagement region with a square cross section and which tapers in the direction of the longitudinal axis to the free end is particularly preferably envisaged. This permits a secure engagement with a correspondingly or complementarily shaped recess at the axial end of a shaft and moreover ensures that the engagement region on operation of the drive motor of the pump assembly can also be easily disengaged from the shaft again.

The seal is preferably fixed on the carrier. I.e. the seal does not move in the direction of the longitudinal axis relative to the carrier, but rather the actuation pin moves relative to the carrier and thus also relative to the seal. The actuation pin preferably bears with its outer peripheral surface on the inner periphery of the seal and thus slides along a sealing surface of the seal. The seal is preferably designed as a sealing ring, for example as an O-ring.

Further preferably, the carrier seen in the direction of the longitudinal axis comprises an annular disk between the seal and the spring element, on which carrier disk the spring element is supported. The spring element is thereby supported with a longitudinal end on the carrier disk and with its opposite longitudinal end on a contact shoulder on the actuation pin. The actuation pin for this preferably at its first axial end comprises a contact shoulder which faces the second axial end. Thus, the spring element, if it is designed as a compression spring, presses the actuation pin in the direction of its first axial end away from the carrier disk. The carrier disk in its inside comprises an opening through which the actuation pin extends, so that the spring element is situated on one side of the carrier disk and the free second axial end of the actuation pin comprising the engagement region for engagement with the shaft, is situated at the opposite second axial side of the carrier disk.

The spring element is preferably designed as a helical spring. Thereby, the spring element acts preferably as a compression spring as described above.

According to a further preferred embodiment, the carrier disk comprises a radially outwardly projecting collar which is preferably designed for receiving at least one weld seam. Thus, the carrier disk not only serves for supporting the spring element, but can simultaneously serve for being welded to adjacent components in particular the can. I.e. the weld seam to be received in particular is the weld seam which serves for connection to the can. Particularly preferably, the carrier disk with its outer periphery defines the largest outer diameter of the actuation device, i.e. preferably the outer periphery of the collar of the carrier disk defines the greatest outer diameter of the actuation device.

The spring element is further preferably surrounded on the outer periphery by a spring housing. This spring housing can comprise an inwardly directed projection or a radially inwardly directed shoulder which serves as an abutment for the actuation pin. Thus, the actuation pin with its first axial end can come into bearing contact on such an abutment or on such a shoulder. The abutment or the shoulder is preferably designed as an annular projection on the inner periphery of the spring housing and in its inside comprises an opening, through which a tool can engage into the first axial end of the actuation pin. The spring housing is preferably essentially tubular and surrounds the spring element on the outer periphery and thus protects the spring element in the inside from contamination and contact with external components.

Particularly preferably, the spring housing with one axial end is adjacent the carrier disk. Further preferably, the spring housing is connected, in particular welded to the carrier disk. Thereby, the spring housing is preferably connected to the carrier disk with that axial end which is opposite to the axial end, on which an abutment for the actuation pin is formed. In this manner, the actuation pin and the spring element are fixed between the carrier disk and the spring housing. Thus, the receiver space, in which the spring element is arranged, is permanently closed by way of the welding of the spring housing to the carrier disk, so that the carrier disk, spring housing, spring element and actuation pin are preferably unreleasably connected to one another. These components can thus be securely connected into a preassembled subassembly. A possible weld seam between the spring housing and the carrier disk does not thereby have to be designed in a sealed manner, since the spring element is arranged outside the region filled with fluid, as is mentioned above.

The seal is furthermore preferably arranged in the inside of an annular seal housing. Thereby, the seal housing in particular serves for the centring and fixation of the seal in the carrier. Thus, preferably, the seal housing is also part of the carrier, as is also the case with the spring housing.

The seal housing is connected, in particular welded to the carrier disk preferably at the first axial end of this housing. Thereby, in particular one can achieve a sealed connection between the seal housing and the carrier disk, for example by way of a continuous peripheral weld seam. For example, the production of such a weld seam is possible by way of laser welding, even with an already inserted seal, without the seal become damage due to the effect of heat. Thus, the seal can also be permanently fixed in the carrier via the seal housing, and be part of the premanufactured subassembly.

Further preferably, the spring housing is situated at a first side, i.e. axial side of the carrier disk, and the seal housing at an opposite, second side or axial side of the carrier disk. I.e. the carrier disk lies between the spring housing and the seal housing, wherein preferably the spring housing as well as the seal housing are welded to the carrier disk. Particularly preferably, this can be effected by way of a single, annular weld seam. However, it is also possible to carry out both weldings separately. The carrier disk forms a central element of the actuation device and moreover, as described above, serves preferably for fastening in the can, in particular by way of welding. A simple assembly of the premanufactured subassembly consisting of the carrier disk, spring housing and seal housing with an inserted spring, inserted actuation pin and inserted seal is possible by way of this. The spring housing preferably has a greater axial length than the seal housing. With the actuation device assembled on the can, the spring housing lies outside the can, whereas the seal housing engages in a recess of the can. Thus, only little construction space for receiving the actuation device in the inside of the can is necessary due to the fact that the seal housing has a shorter axial length which is preferably only slightly longer than the axial construction height of the seal.

Further preferably, the annular seal housing at its second axial end comprises a radially inwardly projecting collar, whose inner diameter is smaller than an outer diameter of the in particular annular seal. I.e. this collar is formed on an axial end of the seal housing which is opposite to the axial end connected to the carrier disk. An axial fixation of the seal between the carrier disk and the collar can be achieved by way of the inwardly directed collar. Particularly preferably, the collar holds the seal in a sealing bearing contact on the surface of the carrier disk. Such a sealing bearing contact on the carrier disk has the advantage that a sealed connection between the seal housing and the carrier disk is not necessary, since the seal then seals directly between the outer periphery of the actuation pin and the carrier disk. Alternatively or additionally, the seal can come to sealingly bear on the inner periphery of the seal housing, and the seal housing connected to the carrier disk in a sealed manner. The collar of the seal housing in its inside leaves an opening which is so large that the actuation pin can extend through this and move through this.

The carrier disk, the spring housing and/or the seal housing are preferably formed from sheet metal. Particularly preferably, the spring housing and the seal housing are designed as shaped parts of sheet metal, in particular as deep-drawn parts. The carrier disk is preferably likewise designed of metal and can be cut or punched from sheet metal. I.e. the structure of the carrier is manufactured here exclusively of inexpensive sheet metal parts which are welded to one another. Thus, one may make do without any material-removing machining or cast parts. Particularly preferably, the components are manufactured from stainless steel sheet.

According to a particular embodiment of the invention, at least one component of the actuation device, in particular of the carrier can be designed as one piece with the can or be formed by a part of the can. This component is particularly preferably a seal housing surrounding the seal. One component may be spared in this manner and moreover a particularly good sealing between the can and the actuation pin can be achieved, since the seal can thus bear on the can in a direct manner. A receiving space for the seal can be created on the can by way of forming which is to say reshaping an axial end or base, and the seal is inserted into this space from the outer side. The above-described carrier disk with the spring housing can subsequently be welded onto the face side of the can, by which means the seal is simultaneously fixed in this sealing space.

The seal can be designed as a simple O-ring. Further preferably, the seal is designed as a sealing ring with such a cross section that the inner periphery of the seal has a shorter axial length than the axial length on the outer periphery of the seal. With such a shape, the sealing ring has an essentially triangular cross section and a small contact surface on the inner periphery is created, said contact surface coming into sealing bearing contact with the outer peripheral surface of the actuation pin, so that the friction is minimised in this region. A greater contact surface or sealing surface for the sealing bearing contact in the carrier, in particular in a surrounding seal housing, is simultaneously created on the outer periphery.

According to a further preferred embodiment, a lubricant or a lubricating means can be introduced into the inside of the spring housing, and this lubricant lubricates the region between the actuation pin and the seal, in order to minimise the friction and the wear there. Such a lubricant can be brought into this space for example through the axial opening of the spring housing, which severs for leading through a tool to the actuation pin.

The subject matter of the invention is further a pump assembly, in which an actuation device according to the preceding embodiments is applied. The pump assembly comprises an electric drive motor which is designed as a canned motor. The can is thereby arranged between the stator and the rotor of the electric drive motor. A drive shaft of the pump assembly which carries the rotor is located in the inside of the can. The drive shaft can also be integrally designed with the rotor. In this case, the rotor is designed as a shaft according to the previous description. An actuation device according to the preceding description is arranged in an axial face side, i.e. the axial base of the can. Such an actuation device can be used for deblocking the shaft or the rotor of the pump assembly. For this, the actuation pin is pressed against spring force into the inside of the can, until the axial end with an engagement region of the actuation pin comes into bearing contact or engagement with a corresponding engagement region at the axial end of the shaft or of the rotor in the inside of the can. A possible blockage in the bearings can be released by way of a slight axial movement of the shaft or of the rotor and/or rotation movement of the rotor. On releasing the axial force onto the actuation pin, this is then moved by the spring force of the spring element back into its rest position, i.e. out of the inside of the can, so that the second axial end of the actuation pin disengages from the shaft or the rotor.

According to a particular embodiment of the pump assembly according to the invention, the can is arranged between the rotor and the stator of the electrical drive motor, and an electronics housing is applied onto the axial end of the drive motor, said electronics housing comprising a channel which extends in the axial direction through the electronics housing, lies opposite the actuation device and whose cross section is adapted to the cross section of a tool to be received and able to be engaged with the tool receiver. The electronics housing in particular accommodates the electrical and/or electronic components for the closed-loop control of the drive motor, for example a frequency converter. The channel thereby is designed such that this is completely sealed with respect to the interior of the electronics housing, i.e. is situated outside the interior of the electronics housing. Inasmuch as this is concerned, it is not necessary to open the electronics housing, in order to apply a tool into the channel for actuation the actuation device.

The channel has a cross section which is larger than the diameter of the tool to be received. Thereby, the cross section is preferably only slightly larger. Preferably, the channel is designed such that it permits a leading of a tool in the axial direction and preferably in an essentially centered manner with respect to the longitudinal axis of the channel. The longitudinal axis of the channel thereby preferably runs along the longitudinal axis of the actuation pin and of the shaft or of the rotor of the pump assembly. Thus, the channel leads the tool into or to the tool receiver at the first axial end of the actuation pin. For this, the channel further preferably has a certain minimum length which limits or prevents a tilting or inclination of the tool with respect to the longitudinal axis of the channel.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
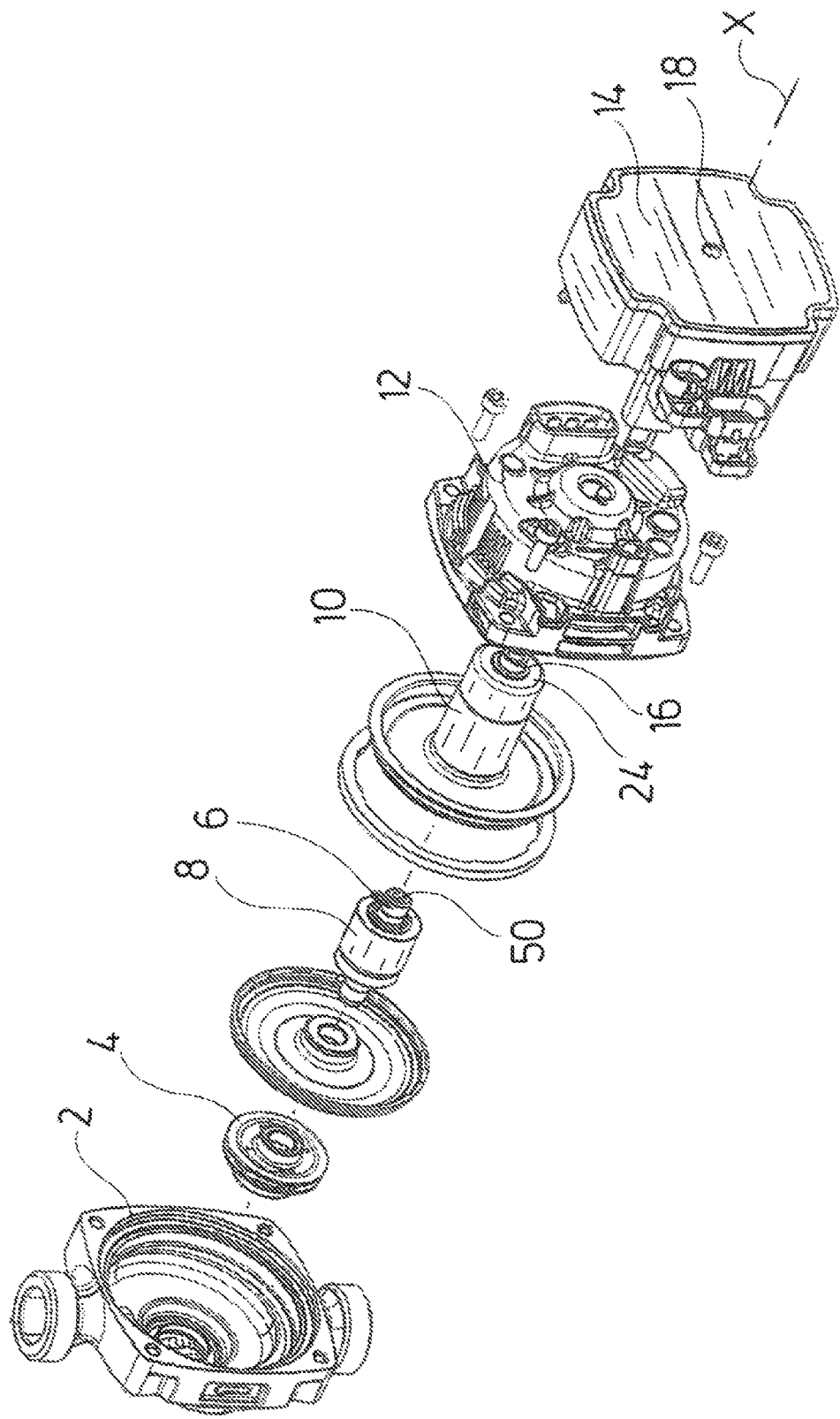
FIG. 1 is an exploded view of a pump assembly according to the invention.

A pump assembly is described hereinafter, in which the actuation device according to the invention in the form of a deblocking device is applied. FIG. 1 in an exploded view shows the basic construction of such a pump assembly. The pump assembly in the known manner comprises a pump housing 2 with an impeller 4 which is arranged therein. The impeller 4 is connected to the rotor 8 of an electric motor via a shaft 6. The rotor 8 lies in the inside of a can 10 which separates the rotor 8 from a stator 20 arranged in the inside of the stator housing or of the motor housing 12. An electronics housing or a terminal box 14, in which electronic components for the regulation and control of the drive motor are arranged, is arranged on the stator housing 12, axially in the direction of the longitudinal or rotation axis X. An actuation device in the form of a deblocking device 16, via which the shaft 6 can be rotated in the inside of the can 10 from the outside, is arranged at the axial end of the can 10 which is away from the pump housing 2 and which is designed in a closed manner. For this, a tool such as a screwdriver can be inserted from outside through a channel 18 in the inside of the electronics housing 14, by way of which tool the deblocking device 16 and via this the shaft 6 can be moved. The channel 18 is opened to the axial face side of the electronics housing 14 and extends through the electronics housing 14 in the longitudinal direction X.

Figure 2:
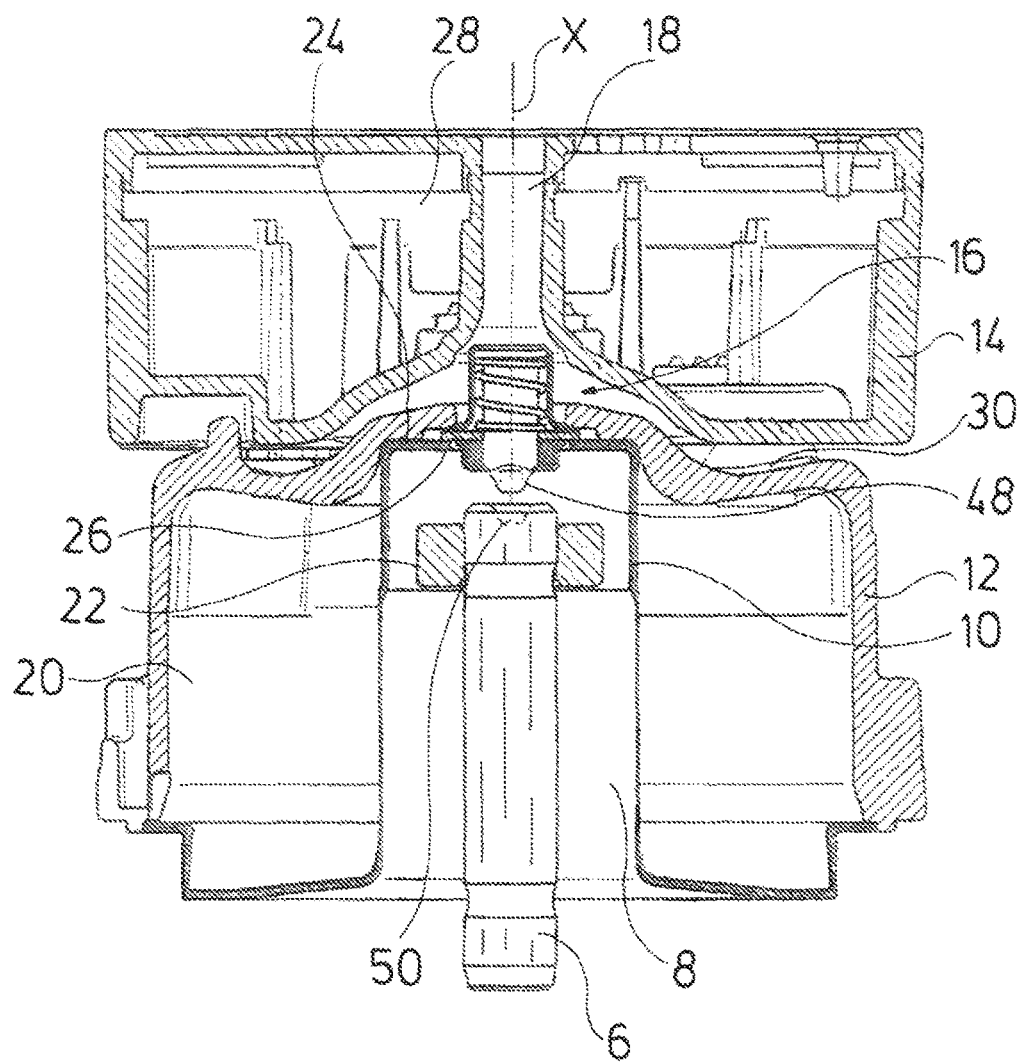
FIG. 2 is a sectioned view of the drive motor of a pump assembly according to the invention.

The construction and the function of the deblocking device 16 are described in more detail by way of FIGS. 2-6. FIG. 2 in section shows the electrical drive motor of the pump assembly which is arranged in the stator housing 12. The electrical drive motor comprises an annular stator 20 which surrounds the can 10 on the outer periphery. The rotor 8 in the inside of the can is arranged on the shaft 6 which is mounted in the inside of the can 10 in a bearing 22. The bearing 22 is fixed in the inside of the can. The can 10 is designed as a canned pot and has a closed axial end, i.e. a base 24 which is away from the pump housing 2. An opening 26, into which the deblocking device 16 is inserted, is formed in the base 24 of the can 10, centrally with respect to the longitudinal axis or rotation axis X of the rotor 6. The channel 18, in a manner lying opposite the deblocking device 16, extends through the electronics housing 14. The channel 18 has a closed peripheral wall and is thus completely separated from the interior 28 of the electronics housing 14 which annularly surrounds the channel 18. The interior 28 of the electronics housing 14 can thus be completely closed and also designed in a manner sealed to the outside. Despite this, the deblocking device 16 is accessible from the outside through the channel 18, if the electronics housing 14 is applied onto the axial face side 30 of the stator housing 12, as is shown.

Figure 3:
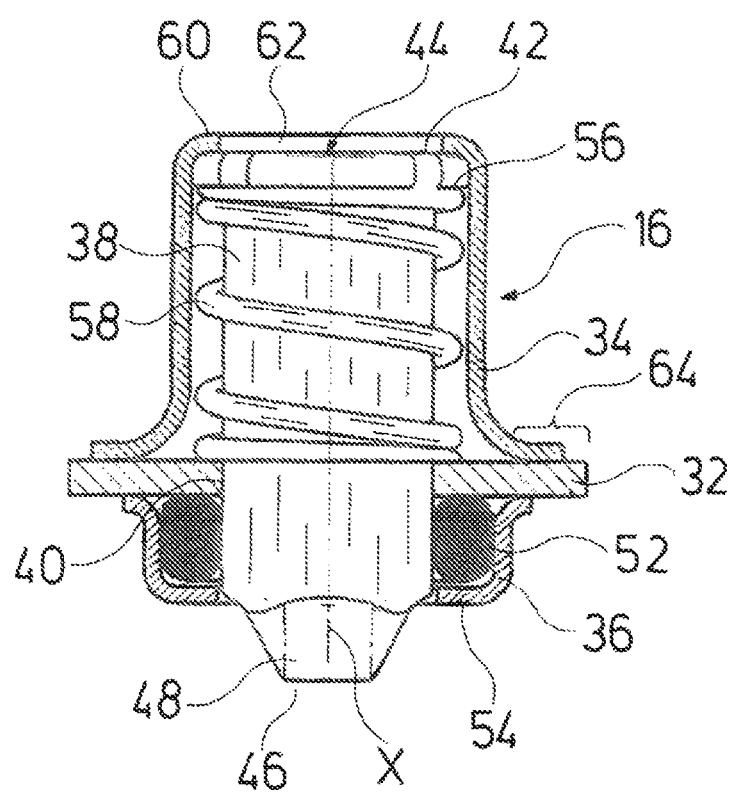
FIG. 3 is a sectioned detail view of the deblocking device in the drive motor according to FIG. 2.
Figure 4:
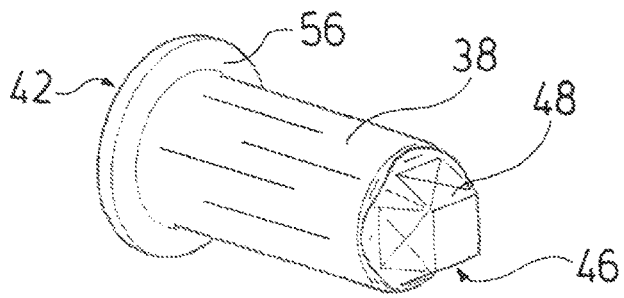
FIG. 4 is a perspective detailed view of the actuation pin of the deblocking device according to FIG. 3.
Figure 5:
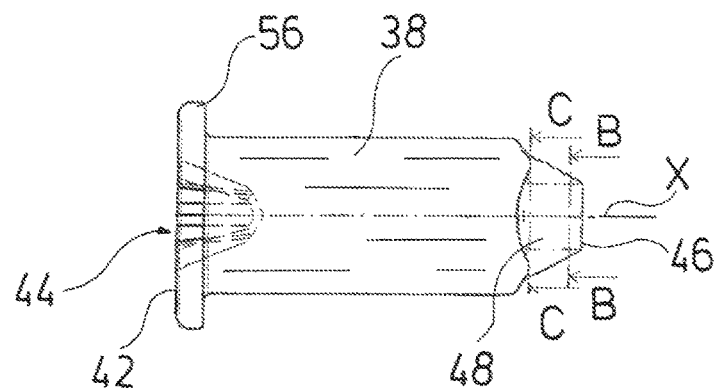
FIG. 5 is a partly sectioned lateral view of the actuation pin according to FIG. 4.

The deblocking device 16 which is shown in FIG. 3 in an enlarged manner comprises a carrier which is formed from three sheet metal components. The central component is a carrier disk 32 which is designed in a plane and annular manner. The second integral part of the carrier is a spring housing 34 which is fastened on an axial side or surface of the carrier disk 32. A seal housing 36 as a third component is fastened on the opposite axial side or surface of the carrier disk 32. An actuation pin 38 is led in the inside of the thus formed carrier in an axially movable manner and in a manner rotatable with respect to the longitudinal axis X. The actuation pin 38 is thereby guided in a central through-opening 40 and thus extends through the carrier disk 32. At a first axial end 42 the actuation pin 38 in a manner arranged centrally with respect to the longitudinal axis X, comprises a tool receiver 44 in the form of a crossed slot. A common Phillips screwdriver which is introduced through the channel 18 can engage into this tool receiver 44. The actuation pin 38 at the opposite second axial end 46 comprises an engagement region which here is designed as a conical squared end 48. The squared end 48 tapers towards the second axial end 46, i.e., as is shown in FIG. 5, the cross section in the plane B-B which is situated closer to the second axial end 46, is smaller than the cross section in the plane C-C which is distanced further from the second end 46. The squared end 48 which forms an engagement region is designed for engagement into a corresponding recess 50 at the axial face end of the shaft 6. I.e. the recess 50 is preferably shaped complementarily to the squared end 48.

The actuation pin 38 extends completely through the seal housing 36 and there bears with an outer wall on the inner periphery of a seal 52. The seal in the embodiment example according to FIGS. 2 and 3 is designed as an O-ring and bears with its outer periphery on the inner wall of the annular seal housing 36. The seal housing 36 with its first axial end is welded to the carrier disk 32. At the opposite axial end, the seal housing 36 comprises a radially inwardly directed annular collar 54. The collar 54 has an inner diameter which is greater than the outer diameter of the actuation pin 38, so that this can extend outwards through the collar 54, so that the engagement region in the form of the squared end 48 is situated outside the seal housing 36. The collar 54 simultaneously has an inner diameter which is smaller than the outer diameter of the seal 52, so that the seal 52 can come to bear on the inner side of the collar 54, and the seal is thus fixed in the axial direction between the carrier disk 32 and the collar 54. Preferably, the collar 54 presses the seal 52 against the carrier disk 32, so that the seal 52 sealingly bears on the carrier disk 32 and on the outer periphery of the actuation pin 38. If the seal 52 is situated in such a manner, it is not absolutely necessary to sealingly connect the seal housing 36 to the carrier disk 32, which is however is preferable. The connection between the seal housing 36 and the carrier disk 32 is preferably effected by way of welding.

The actuation pin 38 adjacently to its first axial end 42 comprises a radially outwardly projecting contact shoulder 56 which faces the second axial end 46. A spring element 58 in the form of a helical spring designed as a compression spring is situated between the contact shoulder 56 and the carrier disk 32. The spring element 58 thus exerts a pressing force onto the actuation pin 38 in the direction of its first axial end 42, so that the actuation pin 38 is pressed into its rest position shown in FIG. 3, in which the engagement region in the form of the squared end 48 is located in its retracted position, in which it is disengaged from the recess 50 in the shaft 6, as is shown in FIG. 2. In this rest position, the actuation pin 38 with the outer periphery of its first axial end 42 bears on a radially inwardly directed annular collar 60 of the spring housing 34. The collar 60 encompasses a central opening 62, through which a tool can be inserted into the tool receiver 44. The seal 52 is situated between the engagement region 48 and the spring element 58, so that the spring element 58 lies in dry space.

The spring housing 34 with its axial end which is away from the collar 60 is welded to the carrier disk 32. In this manner, the spring element 58 together with the actuation pin 38 is fixed in the axial direction, between the carrier disk 32 and the collar 60 of the spring housing 34. The actuation pin 38 is thereby displaceable relative to the carrier 32 in the direction of the longitudinal axis X against the spring, so that the engagement region in the form of the squared end 48 moves further out of the seal housing 36 and can be pressed into the recess 50 on the axial face end of the shaft. Thereby, the actuation pin 38 then with the help of the tool can be rotated in the tool receiver 44 about the longitudinal axis X, in order to release a blockage of the rotor 8. One may make do without this rotation movement if an axial movability of the shaft 6 in the bearing 22 is given. A release of the blockage can then also be achieved by way of a purely axial movement of the actuation pin 38 and of the shaft 6.

The deblocking device 16, as is shown in FIG. 3, forms a premanufactured subassembly which is formed from the described three-part carrier, the seal 52, the spring element 58 and the actuation pin 38. The carrier thereby is formed from three sheet-metal components, wherein the carrier disk 32 is punched in a plane manner from a sheet metal and the spring housing 34 and the seal housing 36 are formed as deep-drawn parts of sheet metal wherein the spring housing 34 has a greater axial length in the direction of the longitudinal axis X than the seal housing 36. This has the advantage that the seal housing 36 only projects into the inside of the can by a small amount, so that less construction space is needed there for the deblocking device. The spring housing 34 is welded to the carrier disk 32 after insertion of the actuation pin and the spring element 58. These parts are thus unreleasably assembled to one another. The seal housing 36 is welded to the carrier disk 32 after the insertion of the seal 52, so that these parts are also fixedly and unreleasably assembled. Thereby, it is conceivable for the spring housing 34, the seal housing 36 and the carrier disk 32 to be welded to one another with a single weld seam.

The carrier disk 32 extends in the radial direction beyond the outer periphery of the spring housing 34 and the seal housing 36 and thus forms a peripheral radially outwardly projecting collar 64, on which the entire deblocking device 36 preassembled in this manner can be welded to the can 10 in the periphery of the opening 26. Thereby, the deblocking device 16 or its carrier disk 32 can be sealingly connected to the base 24 in the peripheral region of the opening 26, by way of an annular weld seam. Instead of such a sealed welding, it would e.g. also be conceivable to design the seal housing 36 with the base 24 in a direct manner as one piece or to shape it out into this. One could then make do without the separate seal housing 36, and the carrier disk 32 welded directly to the base 24 after inserting the seal 52.

The interior of the spring housing 34 can be filled with a lubricant or lubricating means, in order to reduce the friction and wear between the sealing ring 52 and the peripheral wall of the actuation pin 38. Preferably, such a lubricant can be introduced through the opening 62 after the attachment of the deblocking device 16 on the can, if the actuation pin 38 is moved by a certain amount against the spring element 58.

The channel 18 in the electronics housing 14 is designed such that it has an inner diameter which is smaller than the outer diameter of the deblocking device 16, wherein the greatest diameter of the deblocking device 16 here is determined by the outer diameter of the carrier disk 32. The inner diameter of the channel 18 is adapted to the tool to be received, so that this is guided on introduction, and can be moved into the tool receiver 44 in a centered manner with respect to the longitudinal axis X. This means that the inner diameter of the channel 18 is preferably slightly larger than the outer diameter of a common Philips screwdriver which here is to be applied for moving the actuation pin 38 by way of engaging into the tool receiver 44. Such a guiding is thereby in particular also ensured by the length of the channel 18 in the axial direction X. The axial length of the channel 18 is greater, preferably more than thrice, as large as the diameter of the channel 18.

Figure 6:
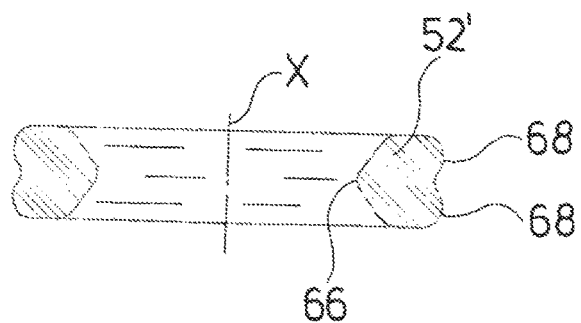
FIG. 6 is an alternative design of the seal in the deblocking device according to FIG. 3.

FIG. 6 shows an alternative embodiment to the seal 52. The seal 52' shown in FIG. 6 does not have a round or circular, but an essentially triangular cross section, wherein the axial length on the inner periphery of the seal 52' in the direction of the longitudinal axis X is shorter than the axial length on the outer periphery of the seal 52'. Thus, a very small contact region 66 which comes into sealing bearing contact on the outer periphery of the actuation pin 38 is formed on the inner periphery. Two bead-like contact regions 68 which are axially distanced to one another, have a greater length on the outer periphery in the axial direction X than the contact region 66, and are envisaged for bearing contact on the inner periphery of the seal housing 36, are formed here on the outer periphery of the seal 52'.

While specific embodiments of the invention have been shown and described in detail to illustrate the application of the principles of the invention, it will be understood that the invention may be embodied otherwise without departing from such principles.

The invention claimed is:

1. An actuation device for a pump assembly for application in a can of a pump assembly for force impingement of a shaft situated in the can, the actuation device comprising:
   a carrier for connection to the can, the carrier comprising a passage extending along a longitudinal axis;
   an actuation pin led in the passage along a passage longitudinal axis and which actuation pin has a first axial end that comprises a tool receiver and an opposite second axial end that comprises an engagement region for force transmission onto a shaft;
   a spring element arranged between the actuation pin and the carrier and ating on the actuation pin in a first axial end direction with a spring force; and
   a seal arranged between the carrier and the actuation pin, in a region between the spring element and the second axial end of the actuation pin, the carrier being configured for the sealed connection to a can, the tool receiver comprising an opening configured for receiving a portion of a tool at the first axial end.

2. An actuation device according to claim 1, wherein the carrier is configured for welding to a can and comprises a peripheral collar for receiving a weld seam.

3. An actuation device according to claim 1, wherein the tool receiver comprises a crossed slot.

4. An actuation device according to claim 1, wherein the engagement region at the second axial end of the actuation pin has one of a rectangular and a square cross section.

5. An actuation device according to claim 1, wherein the seal is fixed in the carrier, the actuation pin being movable between at least a first position and a second position, the actuation pin being located at a spaced location from the shaft in the first position, the actuation pin being configured to engage the shaft in the second position.

6. An actuation device according to claim 1, wherein the carrier seen in the direction of the longitudinal axis comprises an annular carrier disk between the seal and the spring element, on which carrier disk the spring element is supported, the tool receiver comprising an opening.

7. An actuation device according to claim 6, wherein the carrier disk forms a radially outwardly projecting collar which is configured for receiving at least one weld seam.

8. An actuation device according to claim 6, wherein the carrier further comprises a spring housing and an annular seal housing and at least one of the carrier disk, the spring housing and the seal housing is formed from sheet metal.

9. An actuation device according to claim 1, wherein the carrier further comprises a spring housing and the spring element is surrounded by the spring housing at the outer periphery.

10. An actuation device according to claim 9, wherein the carrier further comprises an annular carrier disk and the spring housing is welded to the carrier disk.

11. An actuation device according to claim 1, wherein the carrier further comprises an annular seal housing and the seal is arranged in an inside of the annular seal housing.

12. An actuation device according to claim 11, wherein the carrier further comprises an annular carrier disk and the seal housing is welded at a seal housing first axial end to the carrier disk.

13. An actuation device according to claim 12, wherein the carrier further comprises a spring housing and the spring housing is situated at a first side of the carrier disk, and the seal housing is situated at an opposite second side of the carrier disk.

14. An actuation device according to claim 12, wherein the annular seal housing at a seal housing second axial end comprises a radially inwardly directed collar having an inner diameter that is smaller than an outer diameter of the seal.

15. An actuation device according to claim 1, wherein the carrier further comprises a seal housing surrounding the seal and configured as one piece with a can or formed by a part of the can.

16. An actuation device according to claim 1, wherein the seal is configured as a sealing ring with such a cross section, that the inner periphery of the seal has a shorter axial length than an axial length at the outer periphery.

17. A pump assembly comprising:
a can;
a drive shaft of the pump assembly arranged inside the can;
an actuation device arranged in an axial face side of the can, the actuation device comprising:
a carrier for connection to the can, the carrier comprising a passage extending along a longitudinal axis;
an actuation pin led in the passage along a passage longitudinal axis and which actuation pin has a first axial end that comprises a tool receiver and an opposite second axial end that comprises an engagement region for force transmission onto a shaft;
a spring element arranged between the actuation pin and the carrier and acting on the actuation pin in a first axial end direction with a spring force; and
a seal arranged between the carrier and the actuation pin, in a region between the spring element and the second axial end of the actuation pin, wherein the tool receiver comprises an opening configured for receiving a portion of a tool at the first axial end, wherein the carrier comprises:
an annular carrier disk between the seal and the spring element, on which carrier disk the spring element is supported;
a spring housing; and
an annular seal housing.

18. A pump assembly according to claim 17, further comprising:
an electric drive motor comprising a rotor and a stator, wherein the can is arranged between the rotor and the stator, and
an electronics housing applied onto an axial end of the drive motor, said electronics housing comprising a channel which extends through the electronics housing in the axial direction, lies opposite the actuation device.

19. A pump assembly comprising:
a can;
a drive shaft of the pump assembly arranged inside the can;
an actuation device arranged in an axial face side of the can, the actuation device comprising:
a carrier for connection to the can, the carrier comprising a passage extending along a longitudinal axis;
an actuation pin led in the passage along a passage longitudinal axis and which actuation pin has a first axial end that comprises a tool receiver and an opposite second axial end that comprises an engagement region for force transmission onto a shaft;
a spring element arranged between the actuation pin and the carrier and acting on the actuation pin in a first axial end direction with a spring force;
a seal arranged between the carrier and the actuation pin, in a region between the spring element and the second axial end of the actuation pin;
an electric drive motor comprising a rotor and a stator, wherein the can is arranged between the rotor and the stator, and
an electronics housing applied onto an axial end of the drive motor, said electronics housing comprising a channel which extends through the electronics housing in the axial direction, lies opposite the actuation device and has a cross section that is adapted to a cross section of a tool to be received and able to be brought into engagement with the tool receiver.

\* \* \* \* \*